Figure 1:
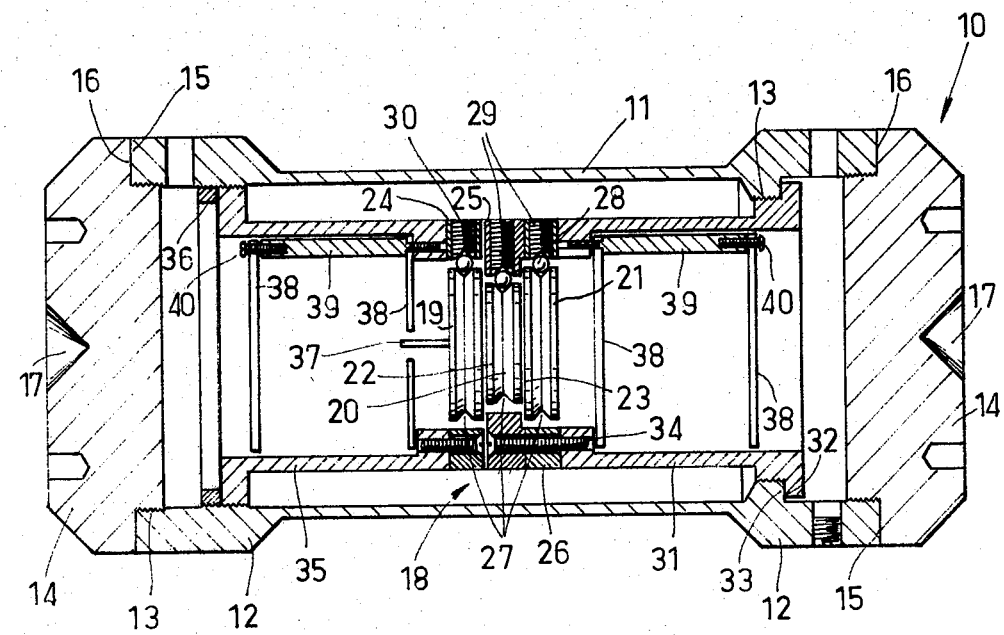

United States Patent [19]

Gladwin

[11] 4,384,496

[45] May 24, 1983

[54] CAPACITIVE LOAD MEASURING DEVICE

[76] Inventor: Michael T. Gladwin, P.O. Box 62, St. Lucia 4067, Australia

[21] Appl. No.: 256,030

[22] Filed: Apr. 21, 1981

[30] Foreign Application Priority Data

Apr. 24, 1980 [AU] Australia .............................. PE3280

[51] Int. Cl.³ .............................................. G01L 1/14
[52] U.S. Cl. ............................. 73/862.64; 177/210 C; 361/283
[58] Field of Search ................. 177/210 C; 73/862.64, 73/718, 724; 361/283

[56] References Cited

U.S. PATENT DOCUMENTS 3,858,097 12/1974 Polye ..................................... 361/283
4,175,428 11/1979 Eilersen ............................. 73/862.64
4,322,775 3/1982 Delatorre ............................ 361/283

Primary Examiner—Joseph W. Hartary
Attorney, Agent, or Firm—Murray Schaffer

[57] ABSTRACT

A load measuring device which includes a hollow metal housing having a wall which is elastically deformable when the housing is subject to an applied load. The elastic deformation varies the capacitance of a capacitor located within the housing to provide a measurement of the applied load.

11 Claims, 2 Drawing Figures

CAPACITIVE LOAD MEASURING DEVICE

This invention relates to a load measuring device and more particularly to a device whose deformation provides a measurement of weight of a body or in another application a measurement of stress in a medium by a measurement of strain.

The majority of weighing instruments which are presently in existence employ spring and lever (optical or mechanical) principles for weight measurement. Such instruments however are limited in precision and mechanical stability particularly in vibration environments. A major advance has been made recently with the use of electrical restivity and semi-conductor deformation gauges, but most of these have considerable problems of thermal drift which make long term high sensitivity use almost impossible. A further device which has recently been developed depends for its operation on the deformation of a solid medium which is magnetised, the deformation of the mechanical field within the medium being used for estimation of the impressed loads. This device, however, although overcoming the disadvantages of moving arm and lever systems, is limited in its range of linearity due to the complexity of the magnetic field pattern and stray fringing fields in the instrument itself.

The present invention has been devised to overcome the above disadvantages of the prior art instruments by providing a load measuring device which is capable of operation at more than an order of magnitude higher sensitivity than any of the above instruments with the exception of the magnetic device. Furthermore, the device of the present invention has no moving springs or levers, is stable in all environments, and is capable of measuring deformation as small as one atomic distance by using the technique of capacitance micrometry.

With the above and other objects in view, this invention resides broadly in a load measuring device adapted to be associated with a body to monitor a load applied thereby, said device including an element which is elastically deformable in response to said load and monitorable capacitance means including a pair of capacitance members supported by said element in operative spaced apart relationship whereby deformation of said element causes a change in the operative relationship of said capacitance members to vary the capacitance of said capacitance means to provide a measurement of said load.

In one form, the capacitance means comprises a three plate capacitor with either the centre plate displacing or one of the outer plates displacing in response to deformation of the elastically deformable element due to a load applied to the element or medium associated with the element. Movement of the centre plate or outer plate of the capacitor causes a change in capacitance which change, when detected and measured, provides an indication of the applied load.

Preferably, the capacitance change of the capacitance means may be detected by a bridge balance technique using a precision inductive voltage divider.

Figure 2:
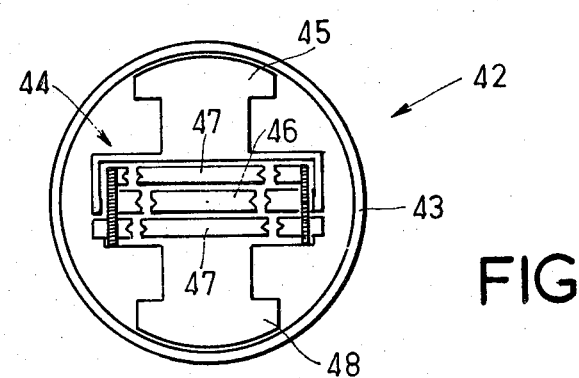

In order that the invention may be more readily understood and put into practical effect, reference will now be made to a preferred embodiment of the invention wherein:

FIG. 1 is a sectional elevational view of one form of load measuring device in its application as a weight gauge; and FIG. 2 is a sectional view of a second form of load measuring device in the form of a stress guage.

Referring to FIG. 1, there is illustrated in sectional view one form of load measuring device 10 according to the present invention including an elastically deformable element in the form of a cylinder 11 being formed at each end with a portion 12 of increased wall thickness. Each portion 12 is internally threaded at 13 such as to be engageable with respective end load transmitting plates 14. The respective portions 12 also include shoulders 15 which are adapted to engage with complimentary shoulders 16 in the respective end plates 14 when the cylinder 11 is fully screwed into engagement with the end plates 14. This ensures that all load applied between the end plates 14 is transmitted directly to the deformation cylinder 11 via the mating shoulders 15, 16 rather than via the engaging threads. Preferably the deformation cylinder is formed of metal such as copper, stainless steel or mild steel. Each end plate 14 is preferably provided with a central conical notch 17 each of which defines a ball support for applying axial loads to the device 10.

Arranged within the cylinder 11 is a load sensing element 18 in the form of three spaced capacitance plates 19, 20 and 21 respectively, with the gap 22 between the capacitance plates 19 and 20 being variable in response to deformation of the cylinder 11 while the gap 23 between plates 20 and 21 remains substantially fixed. Each capacitance plate is of disc-like form and is supported in position by respective outer ring elements 24, 25 and 26 respectively. In one arrangement, each outer ring element is provided with an internal circumferentially extending groove and each capacitance plate is provided with an outer circumferentially extending groove 27 and a ring of epoxy dielectric material is arranged between the respective circumferential grooves whereby each capacitance plate is supported by a respective adjacent ring element and insulated therefrom.

In a preferred arrangement, however, the epoxy dielectric material is eliminated and the capacitance plates are supported by three potash glass spheres or balls 28 which are equally spaced about the circumference of each capacitance plate and partially disposed within the circumferential grooves 27. Each ball 28 is supported to the respective ring element by radially extending grub screws 29 which are provided with hollowed out end portions 30 whereby the respective balls 28 may be partially seated therein. Potash glass balls are used as suspension means as they have substantially the same thermal expansion as the material of the capacitance plates, in this case mild steel.

The fixed plates 20 and 21 are supported to one end of the cylinder 11 by means of an annular support bracket 31 which is threaded at one end thereof for engaging with a mating thread on one end portion 12 of the cylinder 11. The threaded end of the bracket 31 is also provided with a shoulder 32 for engagement with a complimentary shoulder 33 or the portion 12 whereby the capacitance plates 20 and 21 may be firmly and accurately fixed in position. The supporting rings 25 and 26 which support the capacitance plates 20 and 21 respectively are fixed to the opposite end of the support bracket 31 by means of three circumferentially spaced screws 34 only one of which is shown in FIG. 1.

The moving plate 19 is supported in similar fashion to a further annular support bracket 35 which is provided with a threaded portion for engagement with a thread on the opposite end portion 12 of the cylinder 11. Preferably, this thread is fine so that accurate adjustment of the plate 19 with respect to the plates 21 and 20 may be achieved. A locking ring 36 is also provided so that the moving plate 19 can be moved to its desired position relative to the plate 20 and then locked in that position. Wires 37 are then connected to each capacitance plate and lead outwardly of the device 10 so that any change in capacitance can be sensed and measured. The two plates 20 and 21 have a substantially fixed gap 23 therebetween thus providing a reference capacitor which allows the device to be calibrated to compensate for local environmental changes such as in temperature and the like. If necessary, preamplifiers may be arranged within the device 10 such as to provide amplified signals where an adverse electrical environment exists. For this purpose, a pair of spaced shield plates 38 are arranged at each end of the device 10 and supported in position by means of spacers 39 and screws 40, which engage with the respective supports 31 and 35.

When the device is being used as a weight gauge, an axial load is impressed on the end plates 14 via the ball support notches 17 if necessary such that the cylinder 11 is elastically deformed which will cause a corresponding change in the relative disposition of the capacitance plate 19 to the plates 20 and 21 thus changing the gap 22 and the capacitance between the plate 19 and 20. A measurement of this change of capacitance is indicative of the applied load.

The device 42 illustrated in section in FIG. 2 measures stress (or load) in a solid media or within structural members in three components in a plane perpendicular to the axis of the cylinder 43 which is emplaced in a borehole within the medium, with the deformation of the borehole being sensed to give an indication of stress. For this purpose, four sensing elements 44 only one of which is shown in FIG. 2, are arranged in the deformation cylinder 43, three such elements being oriented at 120° to each other and one element being an undeformed reference unit. Each active sensing element 44 includes a centre plate support 45 for supporting a moveable centre capacitance plate 46 whilst a pair of outer capacitance plates 47 having a fixed gap therebetween defining a reference cell are mounted on a support 48. Each plate may be supported by the dielectric ring method or potash glass ball method as described previously. Thus any load on the cylinder 43 will cause a consequential change in the relative disposition of the capacitance plates and thus a change in capacitance which can be measured to provide an indication of stress and strain. In this embodiment, the device is normally functioning as a strain meter.

In all forms the device is capable of measurement of deformation changes ($\Delta l/l$) of order $k \times 10^{-6}$ where k is determined from the ratio of a fixed gap within the device (typically 1 millimeter) to the total gauge length (typically 100 millimeters). Techniques of capacitance micrometry as described below, allow measurements of deformations as small as $10^{-10}$ m to be obtained.

As applied to the present invention, the techniques of capacitance micrometry involves the use of a bridge circuit comprising a precision ratio transformer functioning as an inductive voltage divider arranged in parallel with a load sensing element of the device, for example 18 in FIG. 1. A fixed frequency signal is applied to the bridge circuit and a comparison of voltages at the tap point and the moving plate of the sensing element is made in a comparator. When the readings are equal, and thus the bridge balanced, the reading of the ratio transformer is indicative of the reactance of the sensing element and thus directly proportional to the distance between the capacitance plates. This measurement is the deformation of the cylinder under load. In some applications, especially in the form of the device used in borehole strain monitoring, the centre plate is made to displace under load, and the two outer plates are maintained at a fixed distance from each other. The length of the cylinder, cylinder wall thickness and load surfaces are all dimensioned to produce an acceptable deformation per unit load (typically $10^{-5}$ per kg for heavy duty devices in harsh vibration environments, but as large as $10^{-3}$ per kg in other cases). In the form shown in FIG. 1 the reference half of the sensing element is undeformed with load, and may be trimmed to a precise equivalent load by screws in the outer fixed plate which may be adjusted to thereby alter the fixed capacitance to allow calibration of the sensitivity of the device beyond tolerances normally achieved in machine tolerances during fabrication.

The present invention is usable in various forms. For example the embodiment of the device described with reference to FIG. 1 may itself be a load bearing member in a structure a load bearing member in a weight gauge or it may be attached to a load bearing member in a structure. In this latter form, the device is a "soft" gauge compliant with the structure although the material of which the device is fabricated and the dimensions thereof are chosen for each particular application. The device in the form described with reference to FIG. 2 is intended for usage in very high precision earth strain monitoring (to one part in $10^8$) although it may also be used in other applications, for example monitoring ground loads in engineering structure.

The device is capable of rapid response (0.05 seconds) or integrated long term response (to 1000 seconds) and can withstand g forces from 0.1 to 10 Hz while being capable of operation over more than 100 db range.

Although the embodiments of the invention described in FIGS. 1 and 2 employ three plate capacitors, a two plate capacitor may also be used. Use of a three plate capacitor however enables a fixed reference capacitor to be provided in the device, which capacitor is subject to the same environmental changes as the load sensing capacitor. In a further embodiment, the sensing element may comprise a five plate capacitor, three such plates comprising a load cell and three plates comprising an image cell with the centre plate in common. The image cell in such a case may be a moving outer plate cell of different thermal expansion coefficient, and is used as an "in situ" thermometer and calibration gauge but in most applications, it is not needed.

Thus the present invention provides a stable device which is not subject to creep, which has no moving parts, and which enables an extremely accurate measurement of load to be achieved.

It will of course be realised that the above has been given by way of illustrative example only and that all such modifications and variations thereto as would be apparent to persons skilled in the art are deemed to fall within the broad scope and ambit of the invention as defined in the appended claims.

I claim:

1. A load measuring device adapted to be associated with a body to monitor a load applied thereby, said load measuring device comprising a hollow metal housing having at least one wall which is elastically deformable when said housing is subject to an applied load, a capacitor located within said housing comprising first and second capacitance members, first supporting means for supporting said first capacitance member, second supporting means for supporting said second capacitance member adjacent to said first capacitance member, said first and second supporting means being mounted to said housing at respective spaced apart positions whereby elastic deformation of said wall along one axis as a result of load applied to said housing causes said first and second capacitance members to move relatively towards or away from one another whereby to vary the capacitance of said capacitor to provide a measurement of said applied load.

2. A load measuring device according to claim 1, wherein said capacitance members comprise capacitance plates and wherein each said supporting means is operative to support a respective one of said capacitance plate edgewise.

3. A load measuring device according to claim 2, wherein said capacitance plates are of disc-like form and wherein each said supporting means includes a support member having a circular aperture therein, to associated capacitance plate being supported concentrically within said circular aperture.

4. A load measuring device according to claim 3, wherein each of said capacitance plates has a circumferential groove in its outer edge and wherein each of said support members includes a plurality of radially projecting screws said associated capacitance plate being supported by glass spheres disposed between said screws and said groove.

5. A load measuring device according to claim 1, wherein said first supporting means supports a further capacitance member in fixed relationship relative to said first capacitance member, said first and further capacitance member defining reference capacitance means.

6. A load measuring device adapted to be associated with a body to monitor a load applied thereby, said load measuring device including a hollow metal housing, said housing having a cylindrical wall elastically deformable longitudinally when a load is applied between opposite ends of said housing; capacitance means within said housing comprising first and second capacitance members, first supporting means for supporting said first capacitance member, second supporting means for supporting said second capacitance member adjacent to said first capacitance member, said first and second supporting means being mounted to respective opposite ends of said housing whereby elastic deformation of said wall longitudinally causes said first and second capacitance members to move relatively towards or away from one another to thereby vary the capacitance of said capacitance means to provide a measurement of said applied load.

7. A load measuring device according to claim 6, wherein said capacitance members comprise capacitance plates and wherein each said supporting means is operative to support a respective one of said capacitance plate edgewise.

8. A load mesuring device according to claim 7, wherein said capacitance plates are of disc-like form and wherein each said supporting means includes a supporting ring defining a circular aperture, said associated capacitance plate being supported concentrically within said circular aperture.

9. A load measuring device adapted to be associated with a body to monitor a load applied thereby, said load measuring device including a hollow metal housing having a cylindrical wall deformable diametrically when said housing is subject to an applied load; capacitance means within said housing and including first and second capacitance members, first supporting means supporting said first capacitance member, second supporting means for supporting said second capacitance member adjacent to said first capacitance member, said first and second supporting means being mounted to respective opposite diametric sides of said wall whereby elastic deformation of said wall along a diametric axis causes said first and second capacitance members to move relatively towards and away from one another whereby to vary the capacitance of said capacitance means to provide a measurement of said applied load.

10. A load measuring device according to claim 9, wherein said capacitance members comprise capacitance plates and wherein each said supporting means is operative to support a respective said capacitance plate edgewise.

11. A load measuring device according to claim 9, wherein three said capacitance means are disposed within said housing and oriented at 120° to each other to monitor deformation of said cylindrical wall along three respective diametric axes.

* * * * *